United States Patent
Cheatham, Sr.

[11] Patent Number: 6,079,143
[45] Date of Patent: Jun. 27, 2000

[54] AUTO-TRIEVE

[76] Inventor: Douglas Keith Cheatham, Sr., 1096 MM Hwy., Fredericktown, Mo. 63645

[21] Appl. No.: 09/150,336

[22] Filed: Sep. 10, 1998

[51] Int. Cl.[7] .............................. A01K 97/00; B65H 75/48
[52] U.S. Cl. ........................ 43/17.2; 242/379.2; 242/380; 43/43.12
[58] Field of Search ............... 43/44.87, 44.88, 43/44.9, 44.91, 44.92, 44.97, 43.1, 17.2, 43.12, 17, 54.1, 4, 4.5, 44.2, 44.4, 44.6, 44.8, 41, 41.2, 43.14, 43.15, 43.11; D22/147, 148; 242/380, 379.2

[56] References Cited

U.S. PATENT DOCUMENTS

| | | | |
|---|---|---|---|
| 3,375,602 | 4/1968 | Clark et al. | 43/17.2 |
| 3,628,279 | 12/1971 | Halone | 43/17.2 |
| 3,735,520 | 5/1973 | Jarrett | 43/17.2 |
| 3,802,111 | 4/1974 | Manning et al. | 43/17.2 |
| 3,835,571 | 9/1974 | Berry | 43/21 |
| 4,408,411 | 10/1983 | Skarnells | 43/17.2 |
| 4,598,493 | 7/1986 | O'Brien | 43/17.2 |
| 4,630,390 | 12/1986 | Burkeen et al. | 43/43.11 |
| 4,846,090 | 7/1989 | Palmquist | 114/230 |
| 5,081,784 | 1/1992 | Santucci | 43/17.2 |
| 5,173,067 | 12/1992 | Biba | 441/26 |
| 5,337,510 | 8/1994 | McCue | 43/43.12 |
| 5,350,186 | 9/1994 | Hull et al. | 280/480.1 |
| 5,377,626 | 1/1995 | Kilsby et al. | 119/796 |
| 5,417,008 | 5/1995 | Smith | 43/43.12 |
| 5,452,537 | 9/1995 | Ellison | 43/17.2 |
| 5,615,511 | 4/1997 | Crane et al. | 43/17.2 |
| 5,918,407 | 7/1999 | Sebestyen | 43/43.11 |

FOREIGN PATENT DOCUMENTS 6165  3/1893  United Kingdom ................. 54/34

*Primary Examiner*—Michael J. Carone
*Assistant Examiner*—Fredrick T. French, III
*Attorney, Agent, or Firm*—Patent & Trademark Services; Thomas Zack; Joseph H. McGlynn

[57] ABSTRACT

A fishing lure retrieval apparatus having a housing in which is mounted a spool containing a retrieval line. The spool is biased by an internal spring to pull any extended retrieval line to the spool. A portion of the retrieval external to the housing has a free end with a split ring used to attach a lure retriever. A weighted body may be used as the lure retriever and the housing can be fixed mounted to the side of a boat and the retrieval line moved by hand or the housing may be hand held by a user.

2 Claims, 2 Drawing Sheets ns lower end lure 13 is to be retrieved.
AUTO-TRIEVE

BACKGROUND OF THE INVENTION

When fishing sometimes the lure/hook end with its bait get stuck to something on the water's bottom which is deeper than the fisher person can reach. In such situations it is common to use a lure retriever such as a lead weight. This lead weight slides down the fishing line and is used to knock the lure end free from where stuck. This retriever must then itself be retrieved by the user. Normally to retrieve the lure retriever a second line is attached to it that can be pulled up with the retriever on its end. Usually an old fishing reel, stick of wood, or anything else that can manually be used to rewind the second line is used to retrieve the lure retriever. While satisfactory for some purposes, such lure retriever mechanisms are not always readily available nor are they as effective for their intended use as would be desired.

The present invention provides for an apparatus for a lure retriever that can be fixed to the user's boat or held by itself which will automatically rewind a second line attached to the lure retriever as more fully described hereafter.

DESCRIPTION OF THE PRIOR ART

Lure retrieving devices are known. For example, in U.S. Pat. No. 3,802,111 to Manning et al. a fishhook disengage is disclosed having an elongated pole with an end annulus that is large enough to past over fishing pole's reel and both the elongated pole and the parallel fishing pole.

In the Santucci reference (U.S. Pat. No. 5,081,784) the fishing lure retrieval apparatus is disclosed having a housing with multiple intersecting bores, a lock pin into which housing's bore a fishing line can be mounted. A clip on the housing provides for the securement of a retrieval line.

The Ellison patent (U.S. Pat. No. 5,452,537) discloses a lure retriever has a weighted body attached to a cable whose reel is driven by an electric motor with gears.

In the Crane et al. invention (U.S. Pat. No. 5,615,511) the lure retriever with rides on the fishing line and has a lure release member which is mounted to a body.

The present invention relates to fishing lure retriever apparatus wherein a fishing line has a retrieval line mounted along its length which line can be wound around a spool in a housing attachable to a boat or held in one's hand all as more fully set forth in this specification.

SUMMARY OF THE INVENTION

This invention relates to a fishing lure retrieval apparatus having a housing in which is mounted a spool biased by an internal spring. A retrieval line is wound around the housing's spool and extends therefrom with a portion being external of the housing. The line's free end outside the housing has a split ring mounted on it which is used to hold the lure retriever to the line. A weighted body may be used as the lure retriever and the housing can be fixedly mounted to the side of a boat or be hand held.

It is the primary object of the present invention to provide for an improved fishing lure retrieval apparatus.

Another object is to provide for such an apparatus wherein a lure retrieval line is mounted on a spool which is biased to return the line and its attachments towards the spool.

These and other objects and advantages of the present invention will become apparent to readers from a consideration of the ensuing description and the accompanying drawings.

DESCRIPTION OF THE PREFERRED EMBODIMENT

Figure 1:
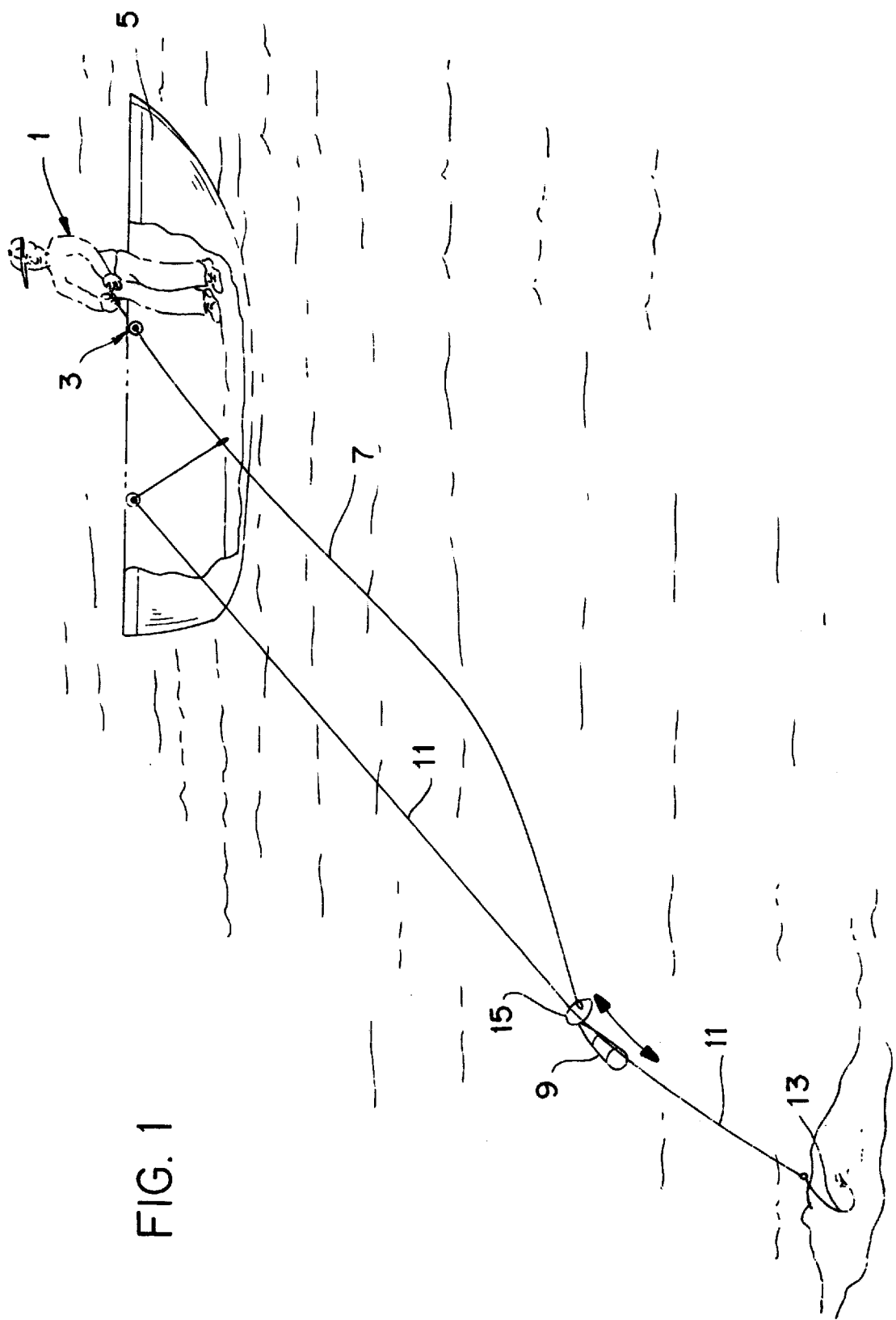
FIG. 1 is a side view of the invention's preferred embodiment showing a fisherman holding the invention's housing in his hands with part of the boat's near side cut away and the retrieval line end extending to a weighted body which moves along the fishing line whose lure is to be retrieved.

FIG. 1 is a side view of the invention's preferred embodiment showing a fisherman 1 holding the invention's housing 3 in his hands with the near side part of the boat's 5 partially cut away. The retrieval line end 7 extends from the housing 3 to a weighted lure retriever body 9 which moves along the fishing line 11 whose lower end lure 13 is to be retrieved. With this set up the fishing line and the retrieval line are generally parallel to each other. A split ring 15 fixed to the lower free end of the retrieval line 7 remote from the housing is used to attach the lure retriever. This arrangement of components permits the lure retrieved weighted body 9 to be used as the lure retriever as it is moved up and down in a direction generally parallel to the tensioned fishing line When the lower lure becomes snagged the lure retriever with its own line is attached to the fishing line. The fisher person then pulls the line out of the housing until its lower attached lure retriever makes contact with the snagged lure. At this point the lue retriever weight is lifted a few inches and then released so as to strike the snagged lure. After repeating this a few times the lure is usually freed from its snagged condition. Now the lure retriever can be brought back to the boat in two different ways. If the lure retriever stays attached to the fishing line you simply reel the lure retriever back to the boat with the fishing reel and its line. In those instances where the lure retriever itself slips past the lure, usually small single hooked lures, the user pulls the lure retriever back to the boat by its own line by hand. As stated, after the body 9 contacts the caught fishing lure 13, a user may manipulate the retrieval line 7 by placing tension on it by pulling and then relaxing the tension by releasing the line. This action is used to dislodge the lure by striking the body 9 against the lure and its surroundings one or more times. In many cases, the lure's hook or hooks need to jarred loose from an underwater object or plant on the bottom and this lure retriever body 9 is capable of doing so.

Figure 2:
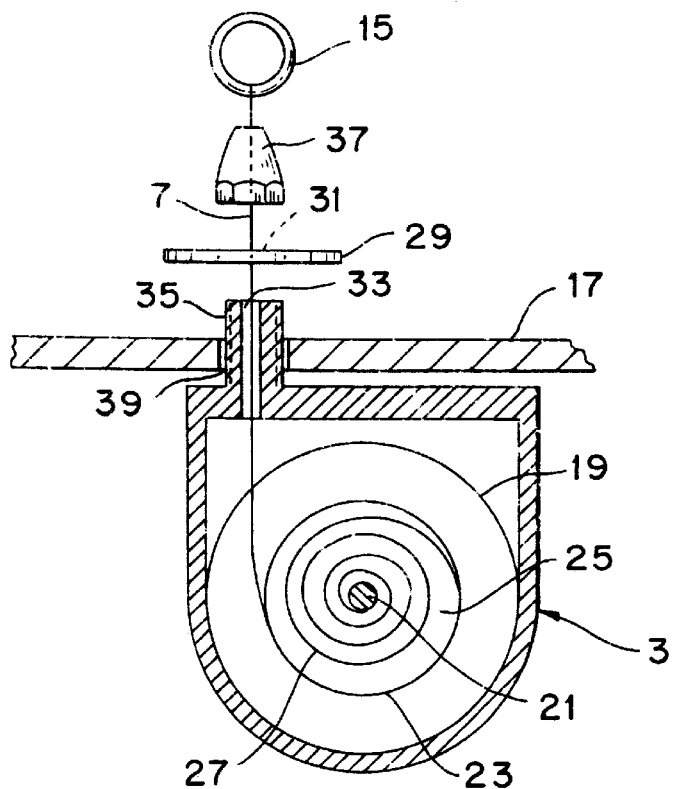
FIG. 2 is a side cross sectional view of the FIG. 1 housing when fixed to a boat's deck.
Figure 3:
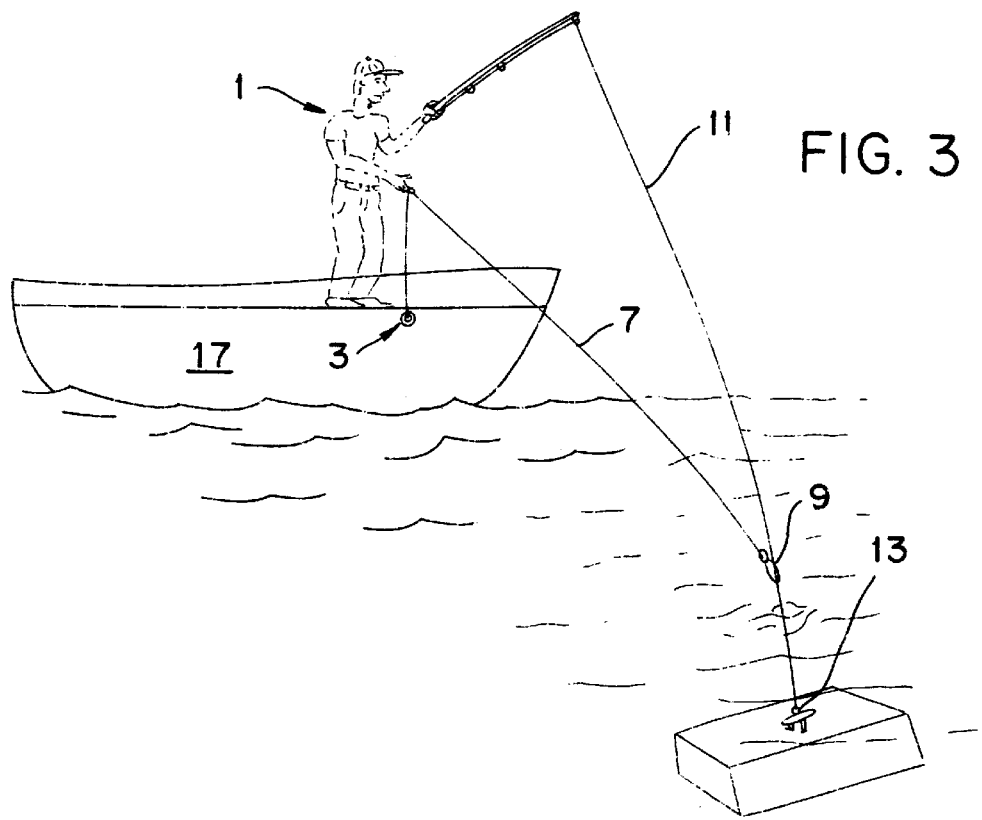
FIG. 3 is a side view of the invention's preferred embodiment similar to FIG. 1 showing the invention's housing attached to the boat with the fisherman hands used to manipulate the retrieval line whose end lure is to be retrieved.

FIG. 2 is a side cross sectional view of the FIG. 1 housing 3 when fixed to a boat's deck 17 as in FIG. 3. As stated with respect to FIG. 1, the housing may be either hand held by a user or attached to a convenient location on the fisherman's boat 5. Within the confines of the housing 3 is a round spool 19 that is mounted to rotate about the fixed center axis rod or shaft 21. Member 21 is fixed to the two opposite internal sides of the housing. Within the inner portion of the spool is a round surface 23 to which the retrieval line 7 is fixed at one of its ends. Encircling the axial rod 21 and fixed to the spool and rod at its two ends is a coil spring 27. This spring is positioned within the spool's inner hollow portion 25. With this arrangement, the spring is positioned to normally exert a biasing opposite force on the retrieval line 7 as the line is pulled away from the spool. Resisting this spring biasing force is the opposing force exerted by the weighted body 9. While the spring is not strong enough to lift the weighted body 9 it is used to help provide for an easy, tangle-free, speedy, line recovery and storage of the retrieval line 7.

Also, shown in FIG. 2 is a stainless steel washer 29 whose center hole 31 allows the line 7 to pass through it. Extending around the housing opening 33 is an encircling tubular housing extension whose external surface has threads 35 that can engage internal threads in the tapered hollow interior nut 37. By tightening the nut 37 on the extension's threads the main body of the housing 3 and the interposed washer 29 mounted on the extension are fixed to the boat as the extension passes through the boat hole 39. Clearly other fastener means could also be used to fixed the housing to the structure of the boat, such as clamps and brackets. At the retrieval line's free end, the previously mention split ring 15 is fixed to the retrieval line's free end. The weighted body 9 (not shown in FIG. 2) would be fixed to the ring and used as the lure retriever as previously described with respect to FIG. 1.

FIG. 3 is a side view of the invention's preferred embodiment, similar to FIG. 1, showing the invention's housing 3 attached to the boat with the fisherman hands used to manipulate another higher part of the retrieval line 7 whose lower end lure is to be retrieved. The side of the boat is not cut away in this figure. TheFIG. 3 arrangement is more likely to be used than the one shown in FIG. 1. FIG. 3 is essentially the same as FIG. 1 except that the housing 3 is fixed to the side of the boat, as in FIG.2, rather than being hand held as in FIG.1. As the retrieval line 7 is moved by hand lure retriever 9 attached to its lower end is moved, as stated before, to free the snagged lure 13 on the fishing line 11.

The terms "line" or lines as used herein for the fishing line and retrieval line includes any type of elongated flexible element that can function to perform the described functions. Normally, nylon fishing lines are used, but other types of high tensional strength flexible lines, cords or string type members could also be used.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified when those modified forms fall within the claimed scope of this invention.

What I claim as my invention is:

1. The combination of a fishing line and a fishing lure retrieval apparatus comprising in combination:

a fishing line have a fishing lure located at one of the line's two ends;

a housing having an externally threaded protruding outlet for receiving a lure retrieval line which can be stored in the housing and for attaching through an aperture in a boat;

a lure retrieval line storable in said housing and having two ends, one of said two lure retrieval line ends being a free end extending through the outlet to outside of said housing:

a line storage member mounted within said housing and adapted to receive and retain said lure retrieval line thereon;

a biasing member operatively associated with said line storage member for usually causing any tensioned lure retrieval line to be biased towards the storage member in the housing; and a weighted body lure retriever attached to said lure retrieval line near the line's free end, said weighted body being slidably mounted on said fishing line by a split ring.

2. The combination as claimed in claim 1, wherein said biasing member is a coil spring fixed at its opposite ends to a axial member in said line storage member, said axial member being in said housing and providing a central axis around which said line storage member can rotate.

* * * * *